(12) United States Patent
Muramoto (10) Patent No.: US 7,092,120 B2
(45) Date of Patent: Aug. 15, 2006

(54) IMAGE TRANSFORMATION APPARATUS AND IMAGE TRANSFORMATION PROGRAM STORAGE MEDIUM

(75) Inventor: Yasuhiko Muramoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 807 days.

(21) Appl. No.: 09/732,704

(22) Filed: Dec. 11, 2000

(65) Prior Publication Data

US 2001/0003483 A1 Jun. 14, 2001

(30) Foreign Application Priority Data

Dec. 10, 1999 (JP) ................... 11-351710

(51) Int. Cl.
*G06F 15/00* (2006.01)
(52) U.S. Cl. .................. 358/1.9; 358/2.1; 358/3.21; 358/3.24; 358/3.1
(58) Field of Classification Search ................. 358/2.1, 358/462, 3.08, 3.21, 3.24, 455, 75, 523, 1.2, 358/3.1; 382/173, 224, 252; 395/109
See application file for complete search history.

(56) References Cited

U.S. PATENT DOCUMENTS

| | | | | |
|---|---|---|---|---|
| 4,701,811 A * | 10/1987 | Moriguchi et al. | .......... | 358/3.1 |
| 5,019,896 A * | 5/1991 | Shimazaki | .................. | 358/534 |
| 5,315,382 A * | 5/1994 | Tanioka | ...................... | 358/523 |
| 5,361,142 A * | 11/1994 | Semasa | ...................... | 358/3.24 |
| 5,774,634 A * | 6/1998 | Honma et al. | ............... | 358/1.9 |
| 5,784,488 A * | 7/1998 | Kuwata | ...................... | 382/176 |
| 5,870,503 A * | 2/1999 | Kumashiro | .................. | 382/252 |
| 5,930,404 A * | 7/1999 | Hattori | ...................... | 382/283 |
| 5,949,966 A * | 9/1999 | Hayashi | ...................... | 358/1.9 |
| 5,956,156 A * | 9/1999 | Fukushima | .................. | 358/447 |
| 5,982,508 A * | 11/1999 | Kashihara | .................. | 358/3.08 |
| 6,108,105 A * | 8/2000 | Takeuchi et al. | ............. | 358/1.2 |
| 6,275,303 B1* | 8/2001 | Fukaya | ...................... | 358/1.9 |
| 6,347,153 B1* | 2/2002 | Triplett et al. | .............. | 382/224 |
| 6,570,665 B1* | 5/2003 | Abramov et al. | ........... | 358/1.13 |
| 6,614,943 B1* | 9/2003 | Morimatsu et al. | ......... | 382/252 |
| 2002/0051145 A1* | 5/2002 | Watanabe et al. | ............ | 358/1.9 |

* cited by examiner

*Primary Examiner*—Kimberly Williams
*Assistant Examiner*—Beniyam Menberu
(74) *Attorney, Agent, or Firm*—Sughrue Mion, PLLC (57) ABSTRACT

An image transformation apparatus for performing a transformation processing for outputting a color image by an image output device such as a color printer. The image transformation apparatus has an image receiving section for receiving an image represented by digital data, an image sort discrimination section for discriminating whether the image received by the image receiving section is a halftone dot image or a multiple gradation image, an image transformation section for applying a conversion processing for the multiple gradation image to the halftone dot image when it is decided by the image sort discrimination section that the image received by the image receiving section is the multiple gradation image, and a driver section for outputting an image discriminated as the halftone dot image by the image sort discrimination section and an image converted into the halftone dot image by the image transformation section to an image output device.

10 Claims, 5 Drawing Sheets

IMAGE TRANSFORMATION APPARATUS AND IMAGE TRANSFORMATION PROGRAM STORAGE MEDIUM

BACKGROUND OF THE INVENTION

1. Field of the Invention

The present invention relates to an image transformation apparatus for performing a transformation processing for outputting a color image by an image output device such as a color printer, and an image transformation program storage medium storing an image transformation program which causes a computer system to operate as such an image transformation apparatus.

2. Description of the Related Art

Hitherto, to perform a color printing using a color printing machine, prior to performing the color printing, a proof image, which is closely similar in color to a color image to be printed by the color printing machine, is printed out using a color printer and the like. To produce such a proof image, the proof image is outputted in accordance with image data for a printer obtained such a manner that a printing profile describing a relation between image data and colors of the actual printed matter, associated with a sort of a printing machine to be used and use conditions of the printing machine (conditions necessary for a certain printing, including a sort of ink to be used and a material of paper; and a sort of a printing machine, is referred to as a printing condition), and a printer profile describing a relation between image data and colors of the actually outputted proof image, associated with a sort of a printer for outputting the proof image and use conditions of the printer (conditions necessary for outputting a certain proof image, including a sort of a printer, is referred to as a printer condition), are determined, and the image data for a printing is subjected to a color conversion processing in accordance with the printing profile and the printer profile and is converted into a data format representative of a halftone dot image adapted for a color printer used for outputting the proof image so that the image data for a printing is converted into the image data for a printer. Thus, it is possible to obtain a proof image which is coincident in color representation with the actual printed matter. Usually, a printing profile associated with a typical printing condition is provided from a printing service trader, and a printer for a proof image output is also provided from a maker of the printer.

The printing profile and the printer profile are stored in an image transformation apparatus, and are controlled so as to finally obtain a proof image of a preferable color representation. In the event that the printing image data is converted into the printer image data and is outputted, usually, the controlled printing profile and the proofer profile are combined to produce a single profile (a device link profile), so that a color conversion processing is applied to the printing image data referring to the device link profile. The image data subjected to the color conversion processing is converted into image data of a data format representative of a halftone dot image, which is adapted for a printer for outputting the proof image, and the image data thus converted is transmitted to the printer so that the printer outputs the proof image.

To output the proof image, the image translation apparatus receives raster image data from a so-called RIP (Raster Image Processor) system in which a color image produced and edited in a page description language is converted into a raster image data, and applies the color conversion processing and the conversion processing to the halftone dot image to the raster image data. With respect to the RIP system, there are known a plurality of types of RIP systems, such as an RIP system having a single function in which a color image described in a page description language is simply converted into a raster image data, and an RIP system having a function of performing the color conversion processing and the conversion processing to the halftone dot image directed to producing of the proof image, similar to the image transformation apparatus.

When it is considered that while such a plurality of types of RIP systems exist, the above-mentioned image transformation apparatus is used, it is possible to adapt the image transformation apparatus to a various type of RIP systems in accordance with such a manner that even if an RIP system is provided with a function of the color conversion processing and the conversion processing to the halftone dot image, a multiple gradation image, which is simply converted into a raster image data before those types of processing are applied, is received from the RIP system, and the color conversion processing and the conversion processing to the halftone dot image are carried out by the image transformation apparatus.

To perform the color conversion processing and the conversion processing to the halftone dot image, while various patterns exist also on halftone dots, it is known that while halftone dots for producing a proof image are selected from among halftone dot patterns which are prepared in the image transformation apparatus beforehand, a picture quality of a color image finally obtained is greatly effected by the selected halftone dot pattern. It is not ensured that the image transformation apparatus prepares the same halftone dot pattern as that adopted in the RIP system having a function of performing the halftone dot processing. When the RIP system has a function of performing the halftone dot processing, such a desire that the function of the halftone dot processing in the RIP system is used will be happened.

Even in the event that it is acceptable to adopt the halftone dot pattern which is not the same as the halftone dot pattern prepared in the RIP system, when the image translation apparatus receives from the RIP system image data representative of a multiple gradation image before the halftone dot processing, there is a need to process a very large capacity of image data to maintain an accuracy. This involves a gradation of the speed of processing.

SUMMARY OF THE INVENTION

In view of the foregoing, it is an object of the present invention to provide an image transformation apparatus capable of suitably processing both image data representative of a multiple gradation image from the host and image data representative of a halftone dot image, and an image transformation program storage medium storing an image transformation program which causes a computer system to operate as such an image transformation apparatus.

To achieve the above-mentioned object, the present invention provides an image transformation apparatus comprising: an image receiving section for receiving an image represented by digital data; an image sort discrimination section for discriminating whether the image received by said image receiving section is a halftone dot image or a multiple gradation image; an image transformation section for applying a conversion processing for the multiple gradation image to the halftone dot image when it is decided by said image sort discrimination section that the image received by said image receiving section is the multiple gradation image; and a driver section for outputting an image discriminated as the halftone dot image by said image sort discrimination section and an image converted into the halftone dot image by said image transformation section to an image output device for outputting a visual image.

This feature makes it possible to suitably process both the multiple gradation image and the halftone dot image, and thereby expanding a range of the use of the available host system and thus enhancing general-purpose properties.

In the image transformation apparatus according to the present invention as mentioned above, it is preferable that said image receiving section receives a color image, and said image transformation section applies a color conversion processing to a color image decided by said image sort discrimination section that the image received by said image receiving section is the multiple gradation image, and applies the conversion processing for the multiple gradation image to the halftone dot image.

In case of a color of multiple gradation image, performing the color conversion processing prior to performing the conversion into the halftone dot image makes it possible to output a color image of a preferable color representation.

In the image transformation apparatus according to the present invention as mentioned above, it is acceptable that said image receiving section receives together with the image additional information indicating whether the image received by said image receiving section is the halftone dot image or the multiple gradation image, and said image sort discrimination section discriminates whether the image received by said image receiving section is the halftone dot image or the multiple gradation image in accordance with the additional information.

For example, tag information is added to a so-called TIFF form of image data. Search of the tag information makes it possible to see properties of the image data.

To discriminate whether it is concerned with the multiple gradation image or the halftone dot image, it does not care about a method of discrimination. For example, it is acceptable that the discrimination is performed through the search of the image data per se. However, in the event that additional information such as the tag information makes it possible to discriminate whether it is concerned with the multiple gradation image or the halftone dot image, the adoption of this way may bring about easy and high speed discrimination.

In the image transformation apparatus according to the present invention as mentioned above, the halftone dot image to be dealt with in the present invention is not restricted to the binary halftone dot image, and it is acceptable that ternary or quaternary halftone dot image is concerned. Also with respect to multiple gradation image, it does not care about the number of gradations, it is acceptable that said image receiving section is adapted to receive a binary halftone dot image and a 256-gradation of multiple gradation image.

To achieve the above-mentioned object, the present invention provides an image transformation program storage medium storing an image transformation program which causes a computer system to operate as an image transformation apparatus for performing an image transformation upon receipt of an image represented by digital data, when the image transformation program is executed by the computer system, said image transformation program comprising:

an image sort discrimination section for discriminating whether the received image is a halftone dot image or a multiple gradation image;

an image transformation section for applying a conversion processing for the multiple gradation image to the halftone dot image when it is decided by said image sort discrimination section that the received image is the multiple gradation image; and a driver section for outputting an image discriminated as the halftone dot image by said image sort discrimination section and an image converted into the halftone dot image by said image transformation section to an image output device for outputting a visual image.

In the image transformation program storage medium according to the present invention as mentioned above, it is preferable that said image transformation program causes the computer system to operate as an image transformation apparatus for performing an image transformation upon receipt of a color image, when the image transformation program is executed by the computer system, and wherein said image transformation section applies a color conversion processing to a color image decided by said image sort discrimination section that the received image is the multiple gradation image, and applies the conversion processing for the multiple gradation image to the halftone dot image.

BRIEF DESCRIPTION OF THE DRAWINGS

FIG. 1 is a structural view of a printing and proof image producing system which an image transformation apparatus according to an embodiment of the present invention is applied to.

DETAILED DESCRIPTION OF PREFERRED EMBODIMENTS

Embodiments of the present invention will be described with reference to the accompanying drawings.

Figure 1:
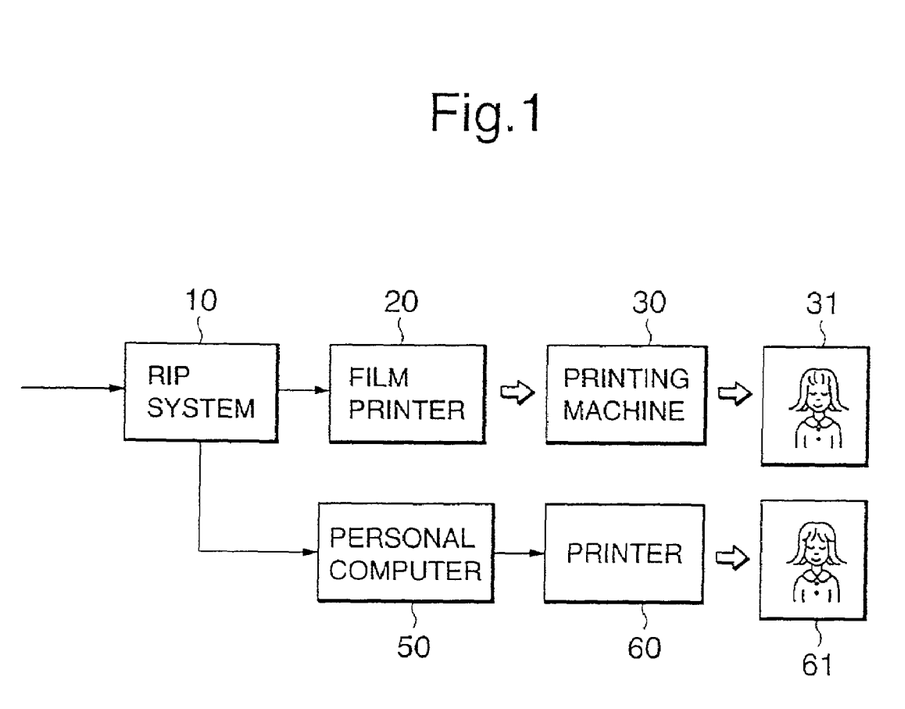

FIG. 1 is a structural view of a printing and proof image producing system which an image transformation apparatus according to an embodiment of the present invention is applied to.

A RIP system 10 receives image data (PDL data) described by a page description language (PDL), which is produced by an electronic page make-up system (not illustrated), and converts the received PDL data into raster image data for CMYK four colors, which is developed into a bit map.

The raster image data obtained by the RIP system 10 is fed to a film printer 20 when a printing is performed. The film printer 20 produces a CMYK four colors of printing film original plate according to the entered raster image data for printing. From the printing film original plate, a printing plate is produced and the printing plate thus produced is mounted on a printing machine 30. An ink is coated on the printing plate mounted on the printing machine 30 and is transferred to a printing paper, so that a printed image 31 is formed on the printing paper.

Such a series of process that the film printer 20 produces the printing film original plate; from the printing film original plate, the printing plate is produced and the printing plate thus produced is mounted on the printing machine 30; the ink is coated on the printing plate mounted on the printing machine 30 and is transferred to the printing paper; and the printed image is formed on the printing paper, is concerned with a very large amount of work and takes a much cost. Thus, before the actual printing work is performed, a printer 60 is used to produce a proof image 61 in a manner set forth below to confirm the finish of the printed image 31 beforehand.

To produce the proof image, the raster image data produced by the RIP system 10 is fed to a personal computer 50.

The RIP system 10 may output both the raster image data representative of a multiple gradation image before the color conversion processing and the halftone dot processing are performed, and the raster image data representative of a halftone dot image after the color conversion processing and the halftone dot processing are performed. Here, it is assumed that the RIP system 10 outputs the raster image data representative of a multiple gradation image, and feeds the same to the personal computer 50.

The personal computer 50 corresponds to one embodiment of the image transformation apparatus of the present invention. The raster image data transmitted from the RIP system 10 to the personal computer 50 is subjected to the color conversion processing and the halftone dot processing in the personal computer 50, and is converted into raster image data for RGB three colors representative of the halftone dot image, which is adapted for the printer 60 for outputting the proof image. The printer 60 receives the data for RGB three colors and outputs the proof image 61 in accordance with the received data.

To perform the color conversion processing in the personal computer 50, color conversion conditions in the color conversion processing are controlled so that colors of the proof image obtained through printing by the printer 60 are coincident with colors of the printed image 31 obtained through printing by the printing machine 30.

To perform the halftone dot processing in the personal computer 50, a desired halftone dot pattern is selected among from a plurality of halftone dot patterns prepared beforehand.

Thus, the color conversion processing is performed under the controlled color conversion conditions, and further the halftone dot processing is performed in accordance with the selected halftone dot pattern, so that a proof image is outputted in accordance with the raster image data for RGB three colors after those processings are performed to confirm the proof image, and thereby confirming the finish of the printing beforehand.

An aspect of the embodiment of the present invention in the printing and proof image producing system shown in FIG. 1 resides in contents of processing executed in the personal computer 50. Thus, first, there will be described hereinafter.

Figure 2:
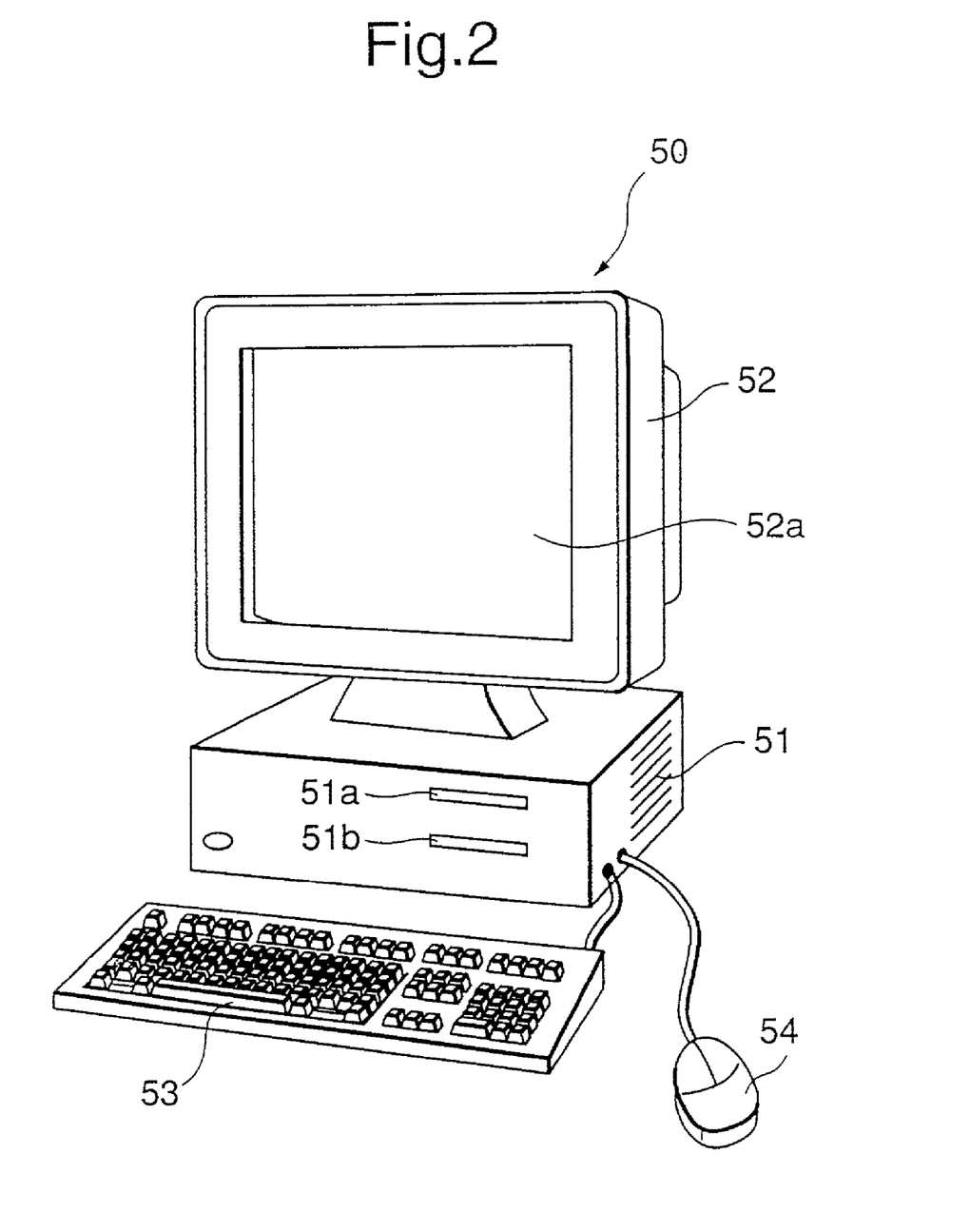
FIG. 2 is a view perspective view of the personal computer shown in FIG. 1 with one block.
Figure 3:
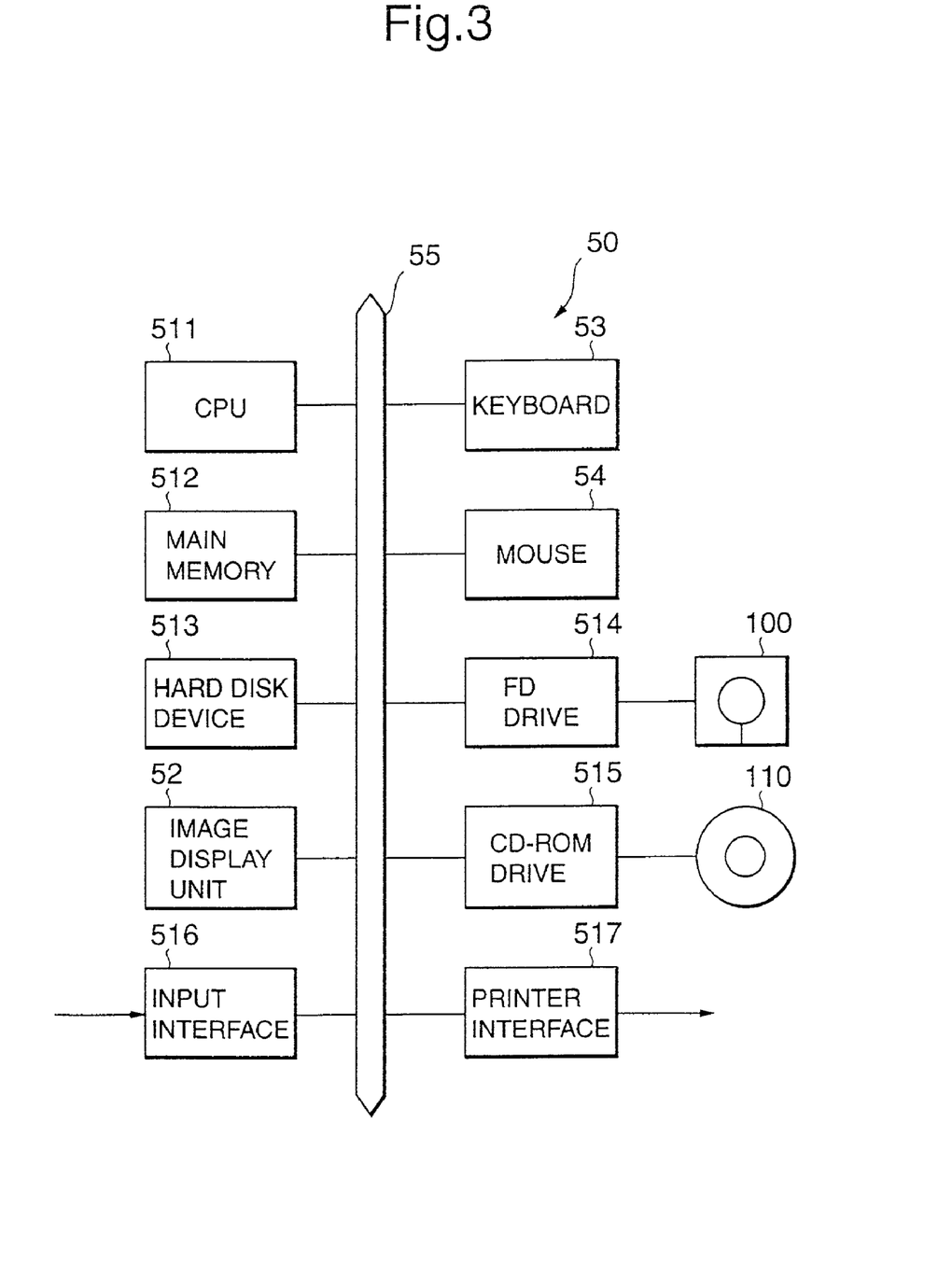
FIG. 3 is a hardware structural view of the personal computer.

FIG. 2 is a view perspective view of the personal computer shown in FIG. 1 with one block. FIG. 3 is a hardware structural view of the personal computer.

The personal computer 50 comprises: on an appearance basis, a main frame 51; an image display unit 52 for displaying an image on a display screen 52*a* in accordance with an instruction from the main frame 51; a keyboard 53 for inputting various sorts of information according to the key operation to the main frame 51; and a mouse 54 for inputting an instruction according to an icon or the like displayed at a designated position on the display screen 52*a*.

The main frame 51 has a floppy disk loading slot 51*a* for loading a floppy disk, and a CD-ROM loading slot 51*b* for loading a CD-ROM.

The main frame 51 incorporates therein, as shown in FIG. 3, a CPU 511 for executing various sorts of programs, a main memory 512 in which a program stored in a hard disk device 513 is read out and developed for execution by the CPU 511, the hard disk device 513 storing various sorts of programs and data, a floppy disk drive 514 for driving a floppy disk 100, a CD-ROM drive 515 for driving a CD-ROM 110, an input interface 516 connected to the RIP system 10 (cf. FIG. 1) for receiving image data from the RIP system 10, and a printer interface 517 for sending image data to the printer 60 for a proof image output. Those elements are connected via a bus 55 with the image display unit 52, the keyboard 53 and the mouse 54.

The CD-ROM 110 stores an image transformation program which causes the personal computer 50 to operate as an image transformation apparatus, and is loaded onto the CD-ROM drive 515. The image transformation program stored in the CD-ROM 110 is up-loaded onto the personal computer 50 and is stored in the hard disk device 513.

Figure 4:
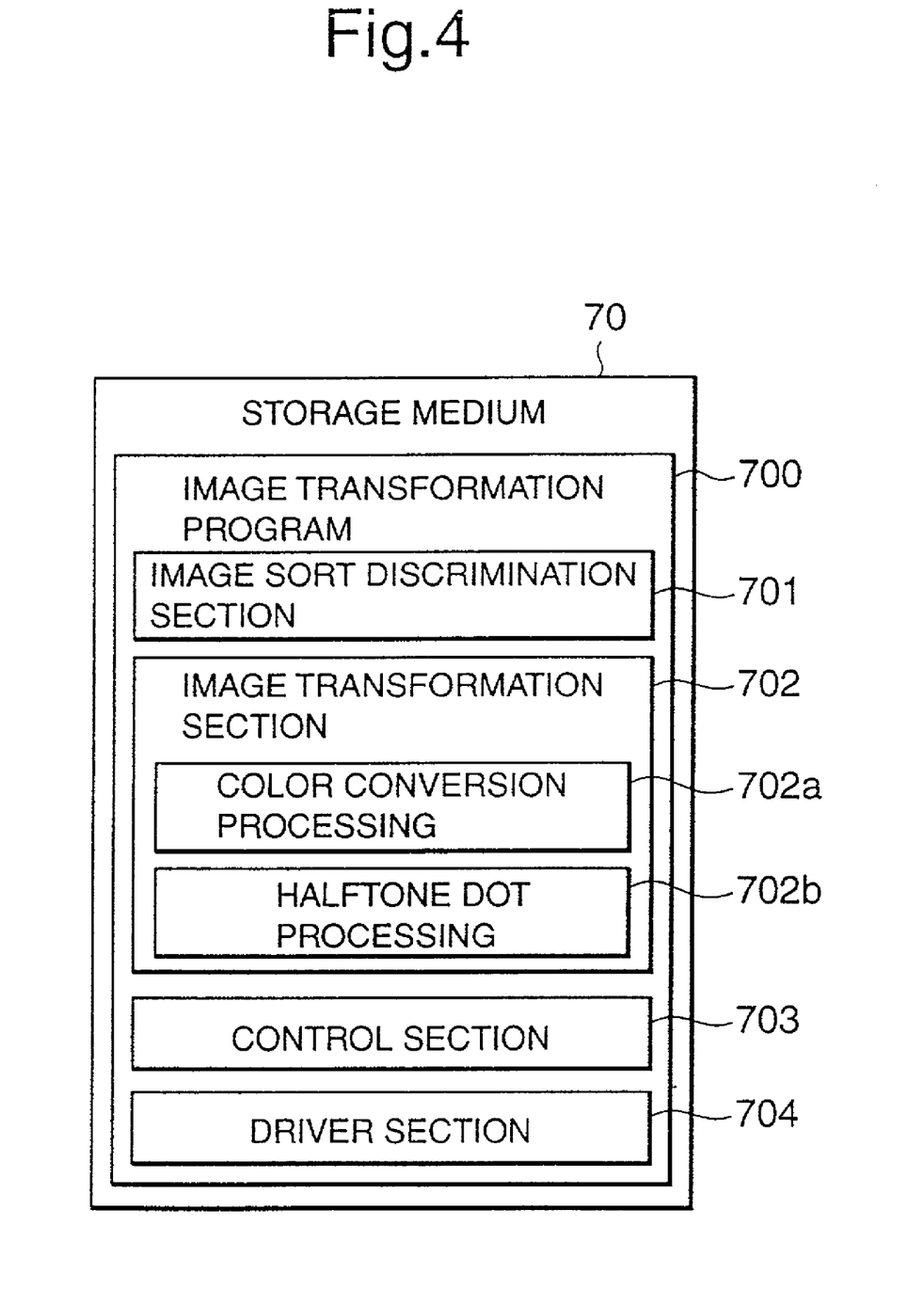
FIG. 4 is an image transformation program stored in a storage medium.

FIG. 4 is an image transformation program stored in a storage medium.

A storage medium 70 is typical of the CD-ROM 110 shown in FIG. 3, the floppy disk 100, and the hard disks in the hard disk device 513. The CD-ROM 110 storing an image transformation program 700 corresponds to an embodiment of the image transformation program storage medium of the present invention. When the image transformation program 700 stored in the CD-ROM 110 is up-loaded onto the personal computer 50 and is stored in the hard disk device 513, the hard disk of the hard disk device 513 also corresponds to an embodiment of the image transformation program storage medium of the present invention. When the image transformation program stored in the hard disk device 513 is down-loaded onto the floppy disk 100, the floppy disk 100 storing the image transformation program also corresponds to an embodiment of the image transformation program storage medium of the present invention.

The image transformation program 700 has an image sort discrimination section 701, an image transformation section 702, a control section 703, and a driver section 704. The image transformation section 702 includes a color conversion processing section 702*a* and a halftone dot processing section 702*b*. Those parts of FIG. 4 are denoted by the same names as those of FIG. 5 but different in reference numbers. The explanation of those parts will be described in conjunction with FIG. 5 directed to an image transformation apparatus. It is noted, however, that while those parts of the image transformation apparatus are each complex of the hardware and the software of the personal computer 50 shown in FIG. 1 to 3, the image transformation program shown in FIG. 4 is concerned with only part of the software of the hardware and the software.

Figure 5:
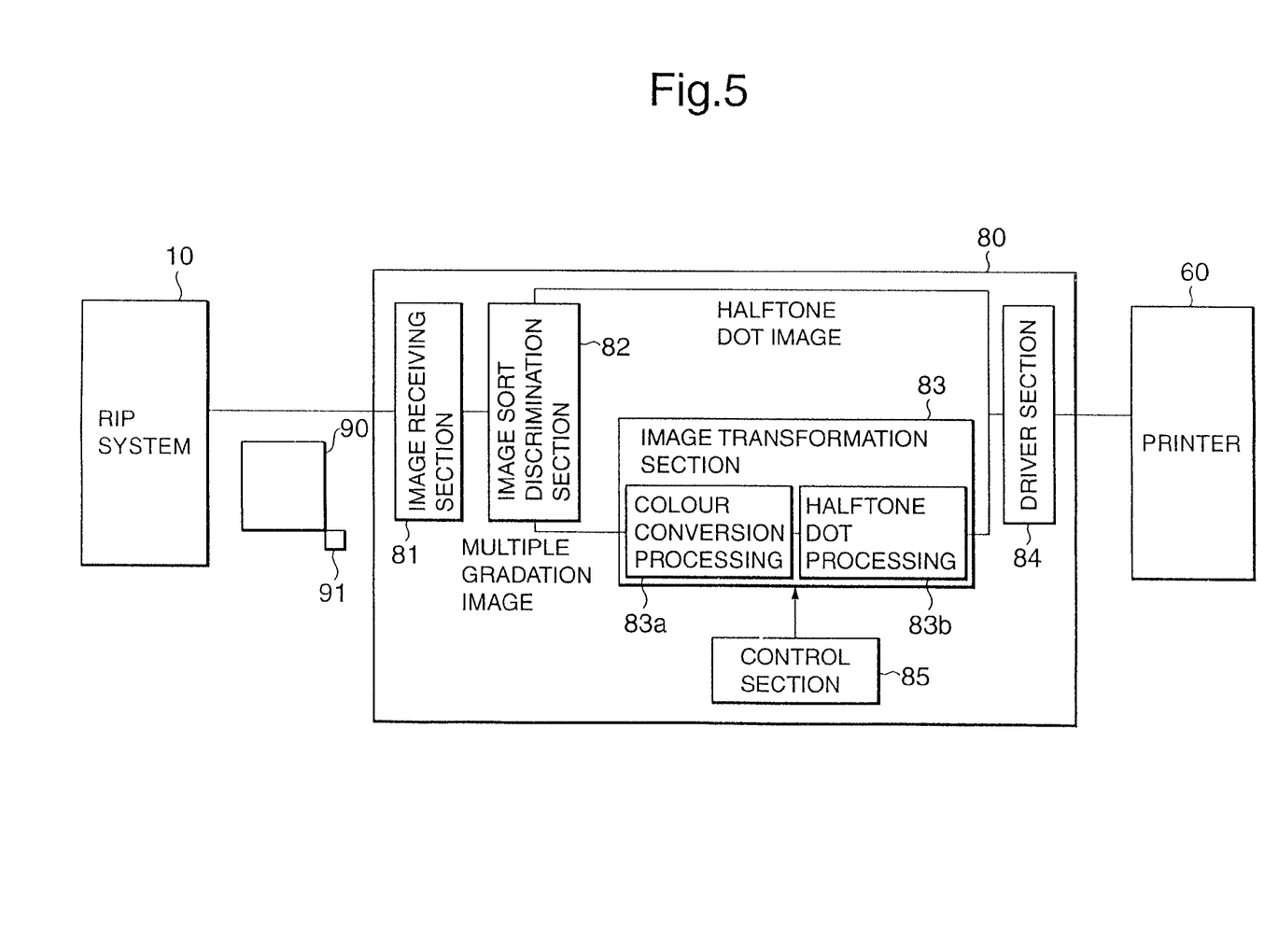
FIG. 5 is a functional block diagram of an image transformation apparatus according to one embodiment of the present invention.

FIG. 5 is a functional block diagram of an image transformation apparatus according to an embodiment of the present invention.

An image transformation apparatus 80 comprises the personal computer 50 shown in FIG. 1 to 3 and an image transformation program to be executed in the personal computer 50. The image transformation apparatus 80 comprises an image receiving section 81, an image sort discrimination section 82, an image transformation section 83, a driver section 84 and a control section 85.

The image receiving section 81 receives a color image represented by raster image data for CMYK four colors generated by the RIP system 10. On a hardware basis, the input interface 516 shown in FIG. 3 corresponds to the image receiving section 81.

According to the present embodiment, the RIP system 10 produces a TIFF type of multiple gradation color image (here 256 gradation of color image) and a binary halftone dot color image, which are simultaneously fed to the image transformation apparatus 80, or alternatively only any one of which is fed to the image transformation apparatus 80.

The image sort discrimination section 82 discriminates whether the color image received by the image receiving section 81 is the binary halftone dot color image or the 256 gradation of color image.

According to the present embodiment, the RIP system 10 produces raster image data representative of a TIFF type of halftone dot image or multiple gradation image, which are fed to the image transformation apparatus 80. As shown in FIG. 5, tag information 91 is added to the TIFF type of image 90. On the tag information 91, there is recorded discrimination information for discriminating whether the received color image is the 2 gradation of image or the 256 gradation of image. Thus, the image sort discrimination section 82 discriminates the sort of the received image by referring to the tag information. In the event that the multiple gradation image is determined, the image is transmitted to the image transformation section 83. On the other hand, in event that the halftone dot image is determined, the image is transmitted to the driver section 84.

On a hardware basis, the CPU 511 executing the image sort discrimination section 701 (cf. FIG. 4) corresponds to the image sort discrimination section 82.

When the image transformation section 83 receives a multiple gradation image from the image sort discrimination section 82, a color conversion processing section 83a applies a color conversion processing to the multiple gradation image, and a halftone dot processing section 83b applies a halftone dot processing to the multiple gradation image after the color conversion processing so as to produce a halftone dot image, and transmits the halftone dot image (raster image data representative of the halftone dot image) thus produced to the driver section 84.

On a hardware basis, the CPU 511 executing the image transformation section 702 (cf. FIG. 4) corresponds to the image transformation section 83.

The driver section 84 outputs halftone dot image (raster image data for RGB three colors) after converted by the image transformation section 83 to the printer 60. On a hardware basis, the CPU 511 by which a driver software (the driver section 704 for the image transformation program shown in FIG. 4) is executed, and the printer interface 517 for sending image data to the printer 60 correspond to the driver section 84.

The control section 85 produces in accordance with an operation of an operator data for controlling color conversion conditions when the color conversion processing section 83a performs a color conversion processing, and transmits the data to the color conversion processing section 83a.

Further, the control section 85 selects a halftone dot pattern in accordance with an operation of an operator, and informs the halftone dot processing section 83b of a matter as to which halftone dot pattern is selected. As result, the halftone dot processing section 83b performs the halftone dot processing in accordance with the received halftone dot pattern.

Accordingly, on the a hardware basis, the keyboard 53 and the mouse 54 shown in FIGS. 2 and 3, and the CPU 511 executing the control section 703 of the color conversion program shown in FIG. 4 correspond to the control section 85.

In this manner, in the image transformation apparatus 80, the image sort discrimination section 82 discriminates whether an image represented by the raster image data, which is transmitted from the RIP system 10, is a halftone dot image or a multiple gradation image. When it is decided as the multiple gradation image, the image is transmitted to the image transformation section so as to be subjected to the color conversion processing and the halftone dot processing, and then transmitted to the driver section 84. On the other hand, when it is decided as the halftone dot image, the halftone dot image is directly transmitted to the driver section 84 bypassing the image transformation section 83. Thus, it is possible to couple a various type of RIP systems to the image translation apparatus as the RIP system 10 which is the host system, and thereby implementing an image translation apparatus having a high general-purpose properties.

Incidentally, according to the present embodiment as mentioned, while it is explained that the halftone dot image is a binary halftone dot image, the halftone dot image to be dealt with in the present invention is not restricted to the binary halftone dot image, and it is acceptable that ternary or quaternary halftone dot image is concerned as far as it is suitable for the printer 60.

Similarly, according to the present embodiment as mentioned, while it is explained that the multiple gradation image is of 256 gradations, the multiple gradation image to be dealt with in the present invention is not restricted to the multiple gradation image of 256 gradations, and it is acceptable that a multiple gradation image of other gradations, for example, 128 gradations and 1024 gradations, is concerned.

Further, in the above-description, while it is explained that the TIFF type of raster image data is dealt with, the present invention is not restricted to the TIFF type of raster image data.

As mentioned above, according to the present invention, it is possible to suitably process both the multiple gradation image and the halftone dot image, and thereby expanding a range of the use of the available host system and thus enhancing general-purpose properties.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image transformation apparatus comprising:
   an image receiving section for receiving an image represented by digital data;
   an image sort discrimination section for discriminating whether the image received by said image receiving section is a halftone dot image or a multiple gradation image;
   an image transformation section for applying a conversion processing for the multiple gradation image to the halftone dot image when it is decided by said image sort discrimination section that the image received by said image receiving section is the multiple gradation image; and
   a driver section for outputting an image discriminated as the halftone dot image by said image sort discrimination section and an image converted into the halftone dot image by said image transformation section to an image output device for outputting a visual image, wherein the received image is either a halftone dot image or a multiple gradation image.

2. An image transformation apparatus according to claim 1, wherein said image receiving section receives a color image, and said image transformation section applies a color conversion processing to a color image decided by said image sort discrimination section that the image received by said image receiving section is the multiple gradation image, and applies the conversion processing for the multiple gradation image to the halftone dot image.

3. An image transformation apparatus according to claim 1, wherein said image receiving section receives together with the image additional information indicating whether the image received by said image receiving section is the halftone dot image or the multiple gradation image, and said image sort discrimination section discriminates whether the image received by said image receiving section is the halftone dot image or the multiple gradation image in accordance with the additional information.

4. An image transformation apparatus according to claim 1, wherein said image receiving section is adapted to receive a binary halftone dot image and a 256 gradation of multiple gradation image.

5. An image transformation program storage medium storing an image transformation program which causes a computer system to operate as an image transformation apparatus for performing an image transformation upon receipt of an image represented by digital data, when the image transformation program is executed by the computer system, said image transformation program comprising:

an image sort discrimination section for discriminating whether the received image is a halftone dot image or a multiple gradation image;

an image transformation section for applying a conversion processing for the multiple gradation image to the halftone dot image when it is decided by said image sort discrimination section that the received image is the multiple gradation image; and a driver section for outputting an image discriminated as the halftone dot image by said image sort discrimination section and an image converted into the halftone dot image by said image transformation section to an image output device for outputting a visual image, wherein the received image is either a halftone dot image or a multiple gradation image.

6. An image transformation program storage medium according to claim 5, wherein said image transformation program causes the computer system to operate as an image transformation apparatus for performing an image transformation upon receipt of a color image, when the image transformation program is executed by the computer system, and wherein said image transformation section applies a color conversion processing to a color image decided by said image sort discrimination section that the received image is the multiple gradation image, and applies the conversion processing for the multiple gradation image to the halftone dot image.

7. An image transformation apparatus comprising:

an image receiving section for receiving an image represented by digital data;

an image sort discrimination section for discriminating whether the image received by said image receiving section is a halftone dot image or a multiple gradation image;

an image transformation section for applying a conversion processing for the multiple gradation image to the halftone dot image when it is decided by said image sort discrimination section that the image received by said image receiving section is the multiple gradation image; and a driver section for outputting an image discriminated as the halftone dot image by said image sort discrimination section and an image converted into the halftone dot image by said image transformation section to an image output device for outputting a visual image, wherein the image receiving section is adapted to receive images from a raster image processor.

8. The image transformation apparatus of claim 1, the image receiving section is adapted to receive a ternary halftone dot image or a quaternary halftone dot image.

9. The image transformation apparatus of claim 1, the image receiving section is adapted to receive a multiple gradation image of 128 gradations or 1024 gradations.

10. An image transformation apparatus comprising:

an image receiving section for receiving an image represented by digital data;

an image sort discrimination section for discriminating whether the image received by said image receiving section is a halftone dot image or a multiple gradation image;

an image transformation section for applying a conversion processing for the multiple gradation image to the halftone dot image when it is decided by said image sort discrimination section that the image received by said image receiving section is the multiple gradation image; and a driver section for outputting an image discriminated as the halftone dot image by said image sort discrimination section and an image converted into the halftone dot image by said image transformation section to an image output device for outputting a visual image, wherein the received images do not have page description language.

* * * * *